(12) United States Patent
 Kashibuchi

(10) Patent No.: US 10,728,531 B2
(45) Date of Patent: Jul. 28, 2020

(54) IMAGE DISPLAY SYSTEM, IMAGE DISPLAY APPARATUS, IMAGE DISPLAY METHOD, AND STORAGE MEDIUM

(71) Applicant: CANON KABUSHIKI KAISHA, Tokyo (JP)

(72) Inventor: Yoichi Kashibuchi, Toride (JP)

(73) Assignee: Canon Kabushiki Kaisha, Tokyo (JP)

(*) Notice: Subject to any disclaimer, the term of this patent is extended or adjusted under 35 U.S.C. 154(b) by 90 days.

(21) Appl. No.: 15/958,532

(22) Filed: Apr. 20, 2018

(65) Prior Publication Data
US 2018/0316910 A1    Nov. 1, 2018

(30) Foreign Application Priority Data
May 1, 2017 (JP) ................. 2017-091011

(51) Int. Cl.
| | | |
|---|---|---|
| *H04N 13/344* | (2018.01) | |
| *G06K 9/00* | (2006.01) | |
| *G06T 19/00* | (2011.01) | |
| *H04N 13/167* | (2018.01) | |
| *H04N 13/398* | (2018.01) | |
| *H04N 13/156* | (2018.01) | |
| *G02B 27/01* | (2006.01) | |
| *H04N 13/239* | (2018.01) | |
| *G02B 27/00* | (2006.01) | |

(52) U.S. Cl.
CPC ....... *H04N 13/344* (2018.05); *G06K 9/00671* (2013.01); *G06T 19/006* (2013.01); *H04N 13/156* (2018.05); *H04N 13/167* (2018.05); *H04N 13/398* (2018.05); *G02B 27/0093* (2013.01); *G02B 27/017* (2013.01); *G02B 2027/0134* (2013.01); *H04N 13/239* (2018.05)

(58) Field of Classification Search
CPC .. H04N 13/344; H04N 13/156; H04N 13/167; H04N 13/398; H04N 13/239; G06K 9/00671; G06T 19/006; G02B 2027/0134; G02B 27/0093; G02B 27/017
See application file for complete search history.

(56) References Cited

U.S. PATENT DOCUMENTS

2014/0292811 A1* 10/2014 Takayama ............. G06T 19/006
                                                  345/633

FOREIGN PATENT DOCUMENTS

JP          2008167348 A       7/2008

* cited by examiner

*Primary Examiner* — Jonathan A Boyd
(74) *Attorney, Agent, or Firm* — Canon U.S.A., Inc. IP Division

(57) ABSTRACT

An image display system selects at least one pixel from among a plurality of pixels of first to fourth images captured by imaging apparatuses, and embeds timestamp information into data representing the selected pixel. As the pixel in which timestamp information is embedded, a pixel which is displayed at a position which is relatively low in visibility for the user is selected so as to reduce degradation in image quality.

19 Claims, 14 Drawing Sheets

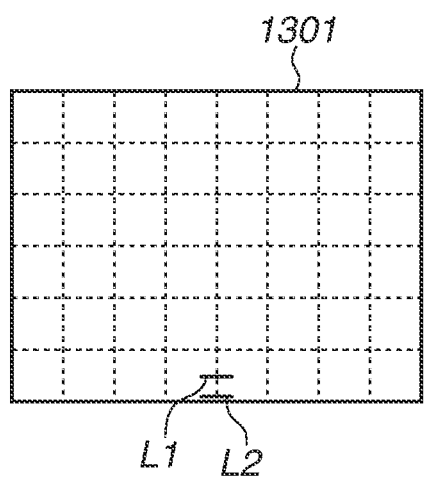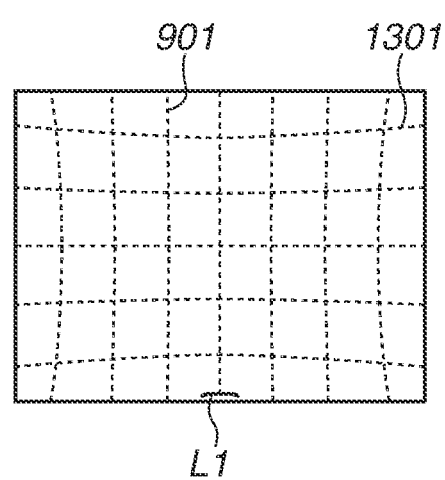

IMAGE DISPLAY SYSTEM, IMAGE DISPLAY APPARATUS, IMAGE DISPLAY METHOD, AND STORAGE MEDIUM

BACKGROUND

Field of the Disclosure

Aspects of the present disclosure generally relate to a technique for synchronizing a plurality of pieces of image data with each other.

Description of the Related Art

In recent years, there have been known image display systems using a composite sense of reality, what is called a mixed reality (MR) technology, as a technique of seamlessly merging real and virtual worlds in real time. Such known image display systems include an image display system which acquires a captured video image by capturing, with, for example, a video camera, an image of a subject that approximately coincides with a subject which is viewed from the pupil position of an HMD-wearing person, who uses a video see-through head-mounted display (HMD). This image display system displays, on a panel inside the HMD, an image obtained by superimposing computer graphics (CG) on the acquired captured video image. The HMD-wearing person observes the image with CG superimposed thereon, which is displayed on the panel inside the HMD.

At that time, it may become important to perform temporal synchronization of captured video images with each other. For example, in an HMD capable of providing stereoscopic views to the user, there may be a case where the HMD concurrently captures two video images respectively corresponding to the left eye and the right eye and performs different image processing operations on the respective captured video images or transmits the captured video images to an external apparatus which performs superimposition processing of CG.

However, in the case of performing different image processing operations on the respective captured video images corresponding to the left eye and the right eye or transmitting the captured video images to an external apparatus, delay times caused by the image processing operations may become different or times required for transmission may become different depending on communication situations. Japanese Patent Application Laid-Open No. 2008-167348 discusses an image processing apparatus which issues the times at which image capturing was performed as timestamp information, in such a manner that, even in a case where different image processing operations are performed on a plurality of video inputs, a plurality of video images can be synchronized with each other. The image processing apparatus discussed in Japanese Patent Application Laid-Open No. 2008-167348 performs synchronization of video images by directly embedding the issued timestamp information into images included in the captured video images. Directly embedding timestamp information into images included in captured video images in the above-mentioned way enables eliminating the need for processing which stores timestamp information separately from captured video images and associates the timestamp information and the captured video images with each other, and thus reducing a load to be applied to the image processing apparatus.

However, in the method of using timestamp information as information used to synchronize a plurality of video images and directly embedding timestamp information into images included in captured video images, embedding timestamp information causes a decrease in image quality of the images. Accordingly, deteriorated images are forced to be displayed to the user, so that a sense of mixed reality may be impaired.

SUMMARY

According to an aspect of the present disclosure, an image display system includes an acquisition unit configured to acquire first image data and second image data obtained by performing image capturing of a real space with a first imaging unit and third image data and fourth image data obtained by performing image capturing of the real space with a second imaging unit, an embedment unit configured to, with respect to each of the acquired first to fourth image data, embed synchronization information used to synchronize the first to fourth image data with each other into data of at least one pixel among pixels configuring each piece of image data, a synchronization unit configured to synchronize the first to fourth image data with each other based on the synchronization information embedded in each of the first to fourth image data, a calculation unit configured to calculate positions of computer graphics (CG) to be superimposed on the second image data and fourth image data based on the first image data and third image data synchronized with each other, a generation unit configured to generate first composite image data and second composite image data by superimposing CG on the second image data and fourth image data based on the calculated positions, and a display unit configured to display the generated first composite image data and second composite image data on a first display and second display, respectively, wherein the embedment unit embeds the synchronization information into pixels on the first to fourth image data corresponding to pixels included in regions which are relatively low in visibility when the first composite image data and second composite image data are displayed on the first display and second display.

Further features of the present disclosure will become apparent from the following description of exemplary embodiments with reference to the attached drawings.

BRIEF DESCRIPTION OF THE DRAWINGS

FIG. 13A is an explanatory diagram of a composite image, and FIG. 13B is an explanatory diagram of a video image which the user views via a prism body.

DESCRIPTION OF THE EMBODIMENTS

Various exemplary embodiments, features, and aspects of the disclosure will be described in detail below with reference to the drawings.

Figure 1:
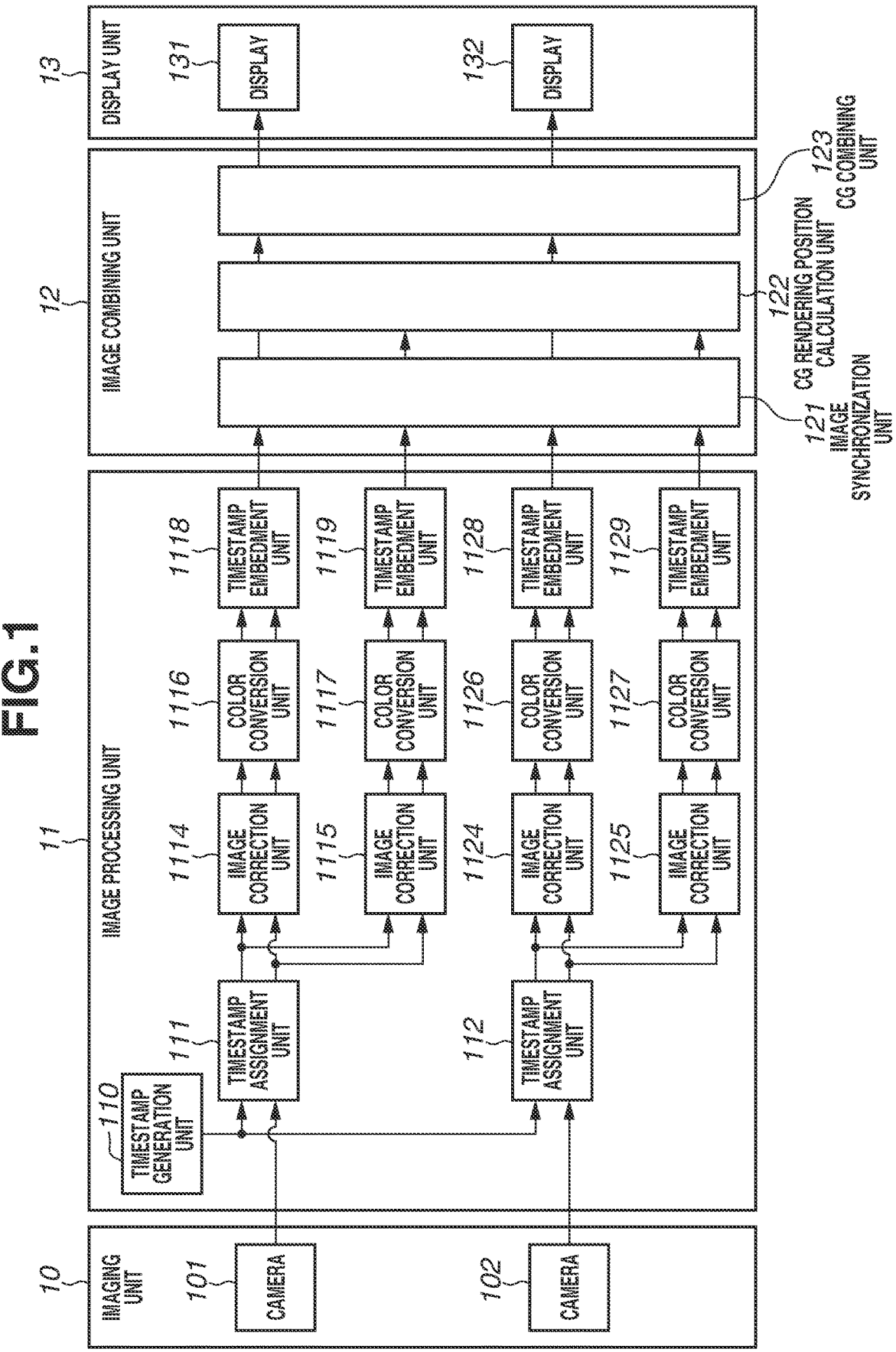
FIG. 1 is a functional block diagram of an image display system.

FIG. 1 is a functional block diagram of an image display system according to a first exemplary embodiment of the disclosure. As illustrated in FIG. 1, the image display system includes an imaging unit 10, an image processing unit 11, an image combining unit 12, and a display unit 13. The imaging unit 10 includes two cameras 101 and 102 respectively provided in conformity with the positions of the left eye and right eye of the user, and the cameras 101 and 102 perform image capturing to generate captured video images 1 and 2, respectively. The image processing unit 11 performs image processing on the captured video images. The image combining unit 12 calculates positions of pieces of computer graphics (CG) data to be superimposed on the captured video images 1 and 2 according to the contents of the captured video images 1 and 2, and generates respective display video images. The display unit 13 displays the captured video images 1 and 2 with CG combined therewith on two displays 131 and 132, which respectively correspond to the left eye and right eye of the user.

The imaging unit 10, the image processing unit 11, and the display unit 13 are included in a head-mounted display (HMD), which is equivalent to an image display apparatus included in the image display system. On the other hand, the image combining unit 12 is included in an image processing apparatus (personal computer (PC)). The HMD and the image processing apparatus are interconnected via a wired system or a wireless system, and each include a hardware configuration, such as a central processing unit (CPU), a read-only memory (ROM), and a random access memory (RAM). Then, for example, various functional configurations and processing operations in a flowchart described below are implemented by the CPU executing a program stored in, for example, the ROM. The RAM has a storage region functioning as a work area in which the CPU loads and executes the program, and the ROM has a storage region storing the program which the CPU executes. With the above-described configuration employed, the user, who wears the HMD including the imaging unit 10 on the head, can observe a video image obtained by superimposing CG on a video image obtained by performing image capturing of a real space, via displays inside the HMD, and thus can feel a composite sense of reality in which real and virtual worlds are merged in real time.

In the present exemplary embodiment, two cameras 101 and 102 respectively acquire captured video images 1 and 2 which have a parallax. The image processing unit 11 performs various image processing operations on the captured video images 1 and 2, and further performs processing for embedding timestamp information, which indicates image capturing times, into the captured video images 1 and 2 subjected to image processing. The image combining unit 12 performs image combining processing for combining CG with the captured video images 1 and 2 with the timestamp information embedded therein.

The display unit 13 displays the captured video images 1 and 2 with CG combined therewith on the displays 131 and 132, respectively. With displaying performed in this way, different video images corresponding to the parallax are presented to the left eye and right eye of the user, so that feeling of a stereoscopic view and a composite sense of reality is enabled.

Hereinafter, details of functional units of the image display system according to the present exemplary embodiment are described. The imaging unit 10 includes cameras 101 and 102, each of which uses a semiconductor element, such as a charge-coupled device (CCD) sensor or a complementary metal-oxide semiconductor (CMOS) sensor, and captures a subject image in a real space for every frame at intervals of 10 milliseconds (ms) to 100 ms. The cameras 101 and 102 can be respective different camera devices or can operate at respective different frame rates.

In the description of the present exemplary embodiment, for ease of description, both the cameras 101 and 102 are assumed to perform image capturing at 60 Hz (at intervals of 16.67 ms). The camera 101 outputs, as a captured video image 1, captured images and signals indicating a video display period of one screen, such as a vertical synchronization signal, a horizontal synchronization signal, and a blanking signal. Similarly, the camera 102 outputs, as a captured video image 2, captured images and signals indicating a video display period of one screen, such as a vertical synchronization signal, a horizontal synchronization signal, and a blanking signal.

The image processing unit 11 acquires the captured video images 1 and 2 from the cameras 101 and 102. Then, with respect to each of the captured video images 1 and 2, the image processing unit 11 detects the beginning of a frame of the video image based on the vertical synchronization signal, detects the beginning of a line in an image of one frame based on the horizontal synchronization signal, and detects the presence of an effective image region based on the blanking signal. Furthermore, the image processing unit 11 includes a timestamp generation unit 110, which generates synchronization information (timestamp information) used to synchronize a plurality of video images, and timestamp assignment units 111 and 112, which assign respective pieces of timestamp information to the captured video images 1 and 2.

Hereinafter, processing that is performed on the captured video image 1, which is output from the camera 101 and then input to the image processing unit 11, is described. The timestamp generation unit 110 constantly measures time inside there. Examples of the method of measuring time include a method of using an internal counter to count a specified cycle, a method of using a timer configured with, for example, a processing device such as a CPU, and a method of using identifier (ID) information which is incremented by, for example, an external reference signal, but the present exemplary embodiment is not limited to these methods.

The captured video image 1 input to the image processing unit 11 and an output of the timestamp generation unit 110 are input to the timestamp assignment unit 111. The timestamp assignment unit 111 acquires timestamp information from the timestamp generation unit 110 according to the input captured video image 1, and then assigns the timestamp information to the captured video image 1. Furthermore, while the timestamp assignment unit 111 assigns timestamp information to the captured video image 1, this is different from "embedding" described below, and is to append (associate) timestamp information to (with) each frame of a captured video image.

Each of an output of the captured video image 1 and an output of the timestamp information from the timestamp assignment unit 111 is branched into two outputs. One output of the captured video image 1 is input to an image correction unit 1114. The other output of the captured video image 1 is input to an image correction unit 1115. Similarly, one output of the timestamp information output from the timestamp assignment unit 112 is input to an image correction unit 1124, and the other output thereof is input to an image correction unit 1125.

One output of each captured video image is used as a background with which CG is combined to generate a composite video image, and the other output of each captured video image is used as an image used to calculate the position and orientation of the cameras 101 and 102 (i.e., the HMD) by detecting, for example, a marker or a natural feature on the image. In this way, because of different uses, each of the captured video images 1 and 2 is branched into two outputs. In other words, since appropriate image processing operations differ with respect to a plurality of captured video images which differ in use, each captured video image is divided into two outputs to be subjected to different image processing operations.

In the description of the present exemplary embodiment, when each frame image of the captured video images 1 and 2 is branched into two outputs, an image for background and an image for position and orientation calculation are assumed to be the same image. Thus, with regard to each frame image of the captured video image 1, the image for background and the image for position and orientation calculation are the same as the original frame image of the captured video image 1, and this also applies to the captured video image 2. However, the image for background and the image for position and orientation calculation do not need to be the same image, but can be images which differ in angle of view or resolution.

The output of the captured video image 1 subjected to image correction processing by the image correction unit 1114 is input to a color conversion unit 1116, which performs color conversion processing. The output of the captured video image 1 subjected to color conversion processing by the color conversion unit 1116 is input to a timestamp embedment unit 1118. Furthermore, during a period from when timestamp information is assigned to (associated with) a captured video image by the timestamp assignment unit 111 to when the captured video image is input to the timestamp embedment unit 1118, the timestamp information is kept associated with the captured video image. Then, the timestamp embedment unit 1118 embeds the timestamp information into the captured video image 1 subjected to color conversion processing, and outputs the captured video image 1 with the timestamp information embedded therein to the image combining unit 12.

The other output of the captured video image 1 and the other output of the timestamp information are subjected to similar processing operations by the image correction unit 1115, a color conversion unit 1117, and a timestamp embedment unit 1119. Moreover, processing which is performed on the captured video image 2 output from the camera 102 and input to the image processing unit 11 is similar to the processing performed on the captured video image 1, and is, therefore, omitted from description. Furthermore, in the present exemplary embodiment, the captured video images output from the cameras 101 and 102 are subjected to the same image processing operations, but can be subjected to respective different image processing operations.

Figure 2:
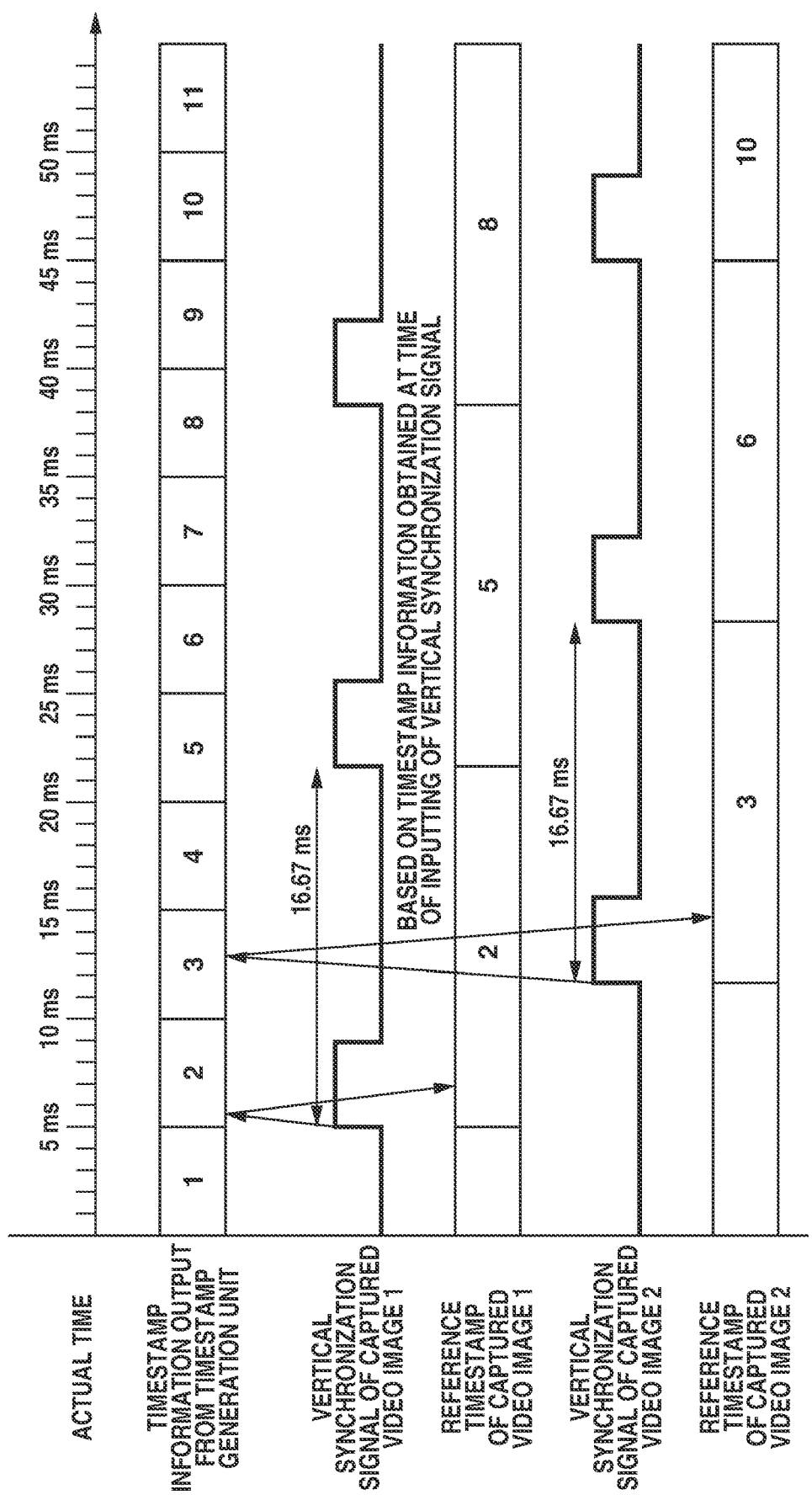
FIG. 2 is a timing chart used to describe details of assignment of timestamp information.

FIG. 2 is a timing chart used to describe details of assignment of timestamp information in the timestamp assignment units 111 and 112. In FIG. 2, the timestamp generation unit 110 is assumed to measure time while incrementing counting at intervals of 5 ms in actual time. In FIG. 2, a vertical synchronization signal of the captured video image 1 and a vertical synchronization signal of the captured video image 2 are also illustrated. The vertical synchronization signal of the captured video image 1 indicates switching of frames based on the rising edge of the signal, and a period from the present rising edge to the next rising edge is 16.67 ms. At this time, the timestamp assignment unit 111 detects the rising edge of the vertical synchronization signal of the captured video image 1, and acquires timestamp information generated by the timestamp generation unit 110 at that point of time. This also applies to the captured video image 2.

The timestamp information is "2" at the time of rising of the vertical synchronization signal of the captured video image 1, and is "5" at the time of next rising of the vertical synchronization signal of the captured video image 1. After that, in this way, the timestamp assignment unit 111 issues, as timestamp information, input information acquired from the timestamp generation unit 110 at timing of each rising of the vertical synchronization signal of the captured video image 1. With respect to the captured video image 2, the timestamp assignment unit 112 performs an operation similar to the above-mentioned processing performed on the captured video image 1.

In this way, the timestamp assignment units 111 and 112 acquire pieces of timestamp information from the timestamp generation unit 110 according to timings of the input captured video images 1 and 2, and issue the respective pieces of timestamp information to the captured video images 1 and 2. Then, the timestamp assignment unit 111 associates (appends) the timestamp information with (to) each frame of the captured video image. Furthermore, in the present exemplary embodiment, a configuration in which the timestamp assignment units 111 and 112 update timestamp information according to rising of the vertical synchronization signals of the captured video images 1 and 2 is described. However, configurations of the timestamp assignment units 111 and 112 are not limited to this. For example, the timestamp assignment units 111 and 112 can update timestamp information according to horizontal synchronization signals. Moreover, the timestamp assignment units 111 and 112 can update timestamp information according to a vertical synchronization signal input to any one of the captured video images 1 and 2. Accordingly, the timestamp assignment units 111 and 112 can use any configuration that is able to discriminate timings of the input captured video images 1 and 2.

Hereinafter, processing which is performed by the image correction units 1114 and 1115, the color conversion units 1116 and 1117, and the timestamp embedment units 1118 and 1119 with respect to the captured video image 1 is described. Furthermore, processing which is performed by the image correction units 1124 and 1125, the color conversion units 1126 and 1127, and the timestamp embedment units 1128 and 1129 with respect to the captured video image 2 is similar to the processing performed with respect to the captured video image 1, and is, therefore, omitted from description.

Figure 3:
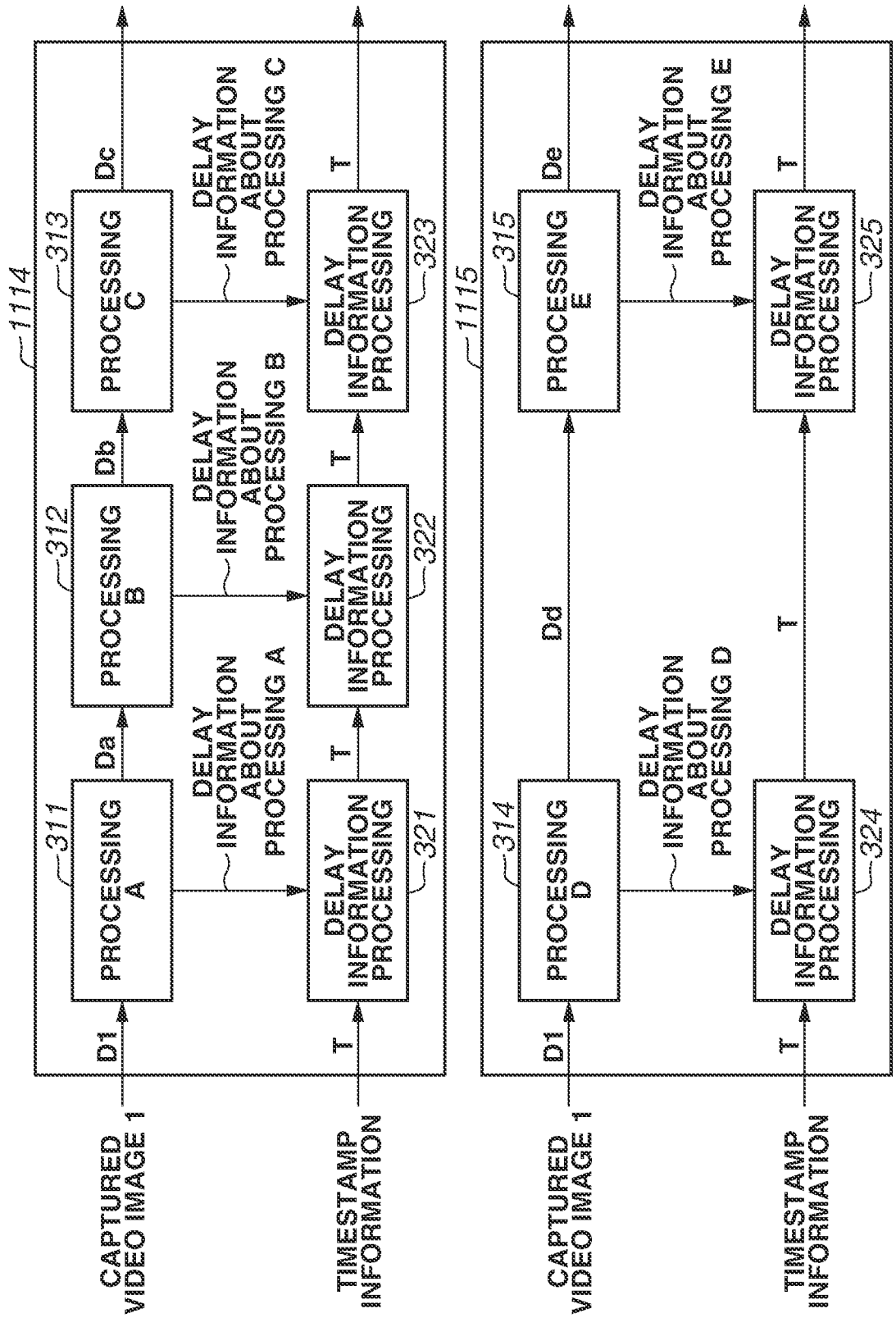
FIG. 3 is a functional block diagram illustrating delay processing that is performed on captured video images.

FIG. 3 is a functional block diagram illustrating delay processing which is performed with respect to a captured video image by the image correction units 1114 and 1115.

Referring to FIG. 3, blocks 311 to 313 of the image correction unit 1114 and blocks 314 and 315 of the image correction unit 1115 perform respective image correction processing operations with respect to the input captured video image 1. The image correction processing operations performed herein include, for example, Bayer interpolation processing, which generates RGB signals from Bayer data to correct for a deficiency of camera pixels in a case where the pixel arrangement of the cameras 101 and 102 is a Bayer arrangement, and shading correction, which corrects optical characteristics of image capturing.

Since the contents themselves of these image correction processing operations are not especially limited, in the present exemplary embodiment, the image correction processing operations in the respective blocks 311 to 315 are respectively referred to as "processing A" to "processing E", and the processing contents thereof are omitted from description. Moreover, the image correction unit 1114 and the image correction unit 1115 are assumed to perform respective different image correction processing operations.

Referring to FIG. 3, the captured video image 1 is input to both the block 311 of the image correction unit 1114 and the block 314 of the image correction unit 1115. In FIG. 3, the input captured video image 1 is denoted by D1. Similarly, in FIG. 3, the captured video images 1 subjected to processing A to processing E by the blocks 311 to 315 are respectively denoted by Da to De.

On the other hand, timestamp information denoted by T in FIG. 3 is input to both the block 321 of the image correction unit 1114 and the block 324 of the image correction unit 1115.

The block 311 performs processing A on the captured video image 1 and then outputs the captured video image 1 with processing A performed thereon. Similarly, the blocks 312 to 315 respectively perform processing B to processing E on the input captured video image 1 and then output the respective processed captured video images 1. On this occasion, when the blocks 311 to 315 respectively perform processing A to processing E, delays of processing time occur according to the respective processing contents.

Blocks 321 to 325 illustrated in FIG. 3 respectively receive pieces of delay information about processing A to processing E from the blocks 311 to 315, and output timestamp information T based on the received pieces of delay information. For example, in a case where delay information caused by processing A in the block 311 is 1 ms, upon receiving the delay information (1 ms), the block 321 delays timestamp information T by 1 ms and then outputs the delayed timestamp information T to the block 322. With this, even when a delay of 1 ms occurs in the block 311, since timestamp information T is also delayed by 1 ms and is then output, the timestamp information T is kept in a state of being associated with the captured video image 1.

The image correction units 1114 and 1115 differ in the number of blocks for performing correction processing and also differ in the content of correction processing to be performed, and, therefore, differ in delay times to occur. However, in the present exemplary embodiment, as described above, the blocks 321 to 325 respectively perform delay information processing. With this, during a period from when timestamp information is assigned to a captured video image by the timestamp assignment unit 111 to when the captured video image with the timestamp information assigned thereto is input to the timestamp embedment unit 1118, the timestamp information T is kept associated with the captured video image.

The color conversion units 1116 and 1117 perform conversion of a color space by performing arithmetic processing for changing RGB components of the input captured video image into YUV components. Conversion of RGB components into YUV components is implemented with use of, for example, the following equations.

$$Y=0.299 \times R+0.587 \times G+0.114 \times B$$

$$U=-0.169 \times R-0.331 \times G+0.500 \times B$$

$$V=0.500 \times R-0.419 \times G-0.081 \times B$$

Here, generally, Y denotes a luminance signal, and U and V denote color-difference signals. Moreover, since human eyes are sensitive to a change in luminance signal but are insensitive to a change in color-difference signal, the color conversion units 1116 and 1117 can be configured to perform arithmetic operations using, for example, the YUV 422 format or the YUV 411 format, in which UV data is compressed.

Figure 4:
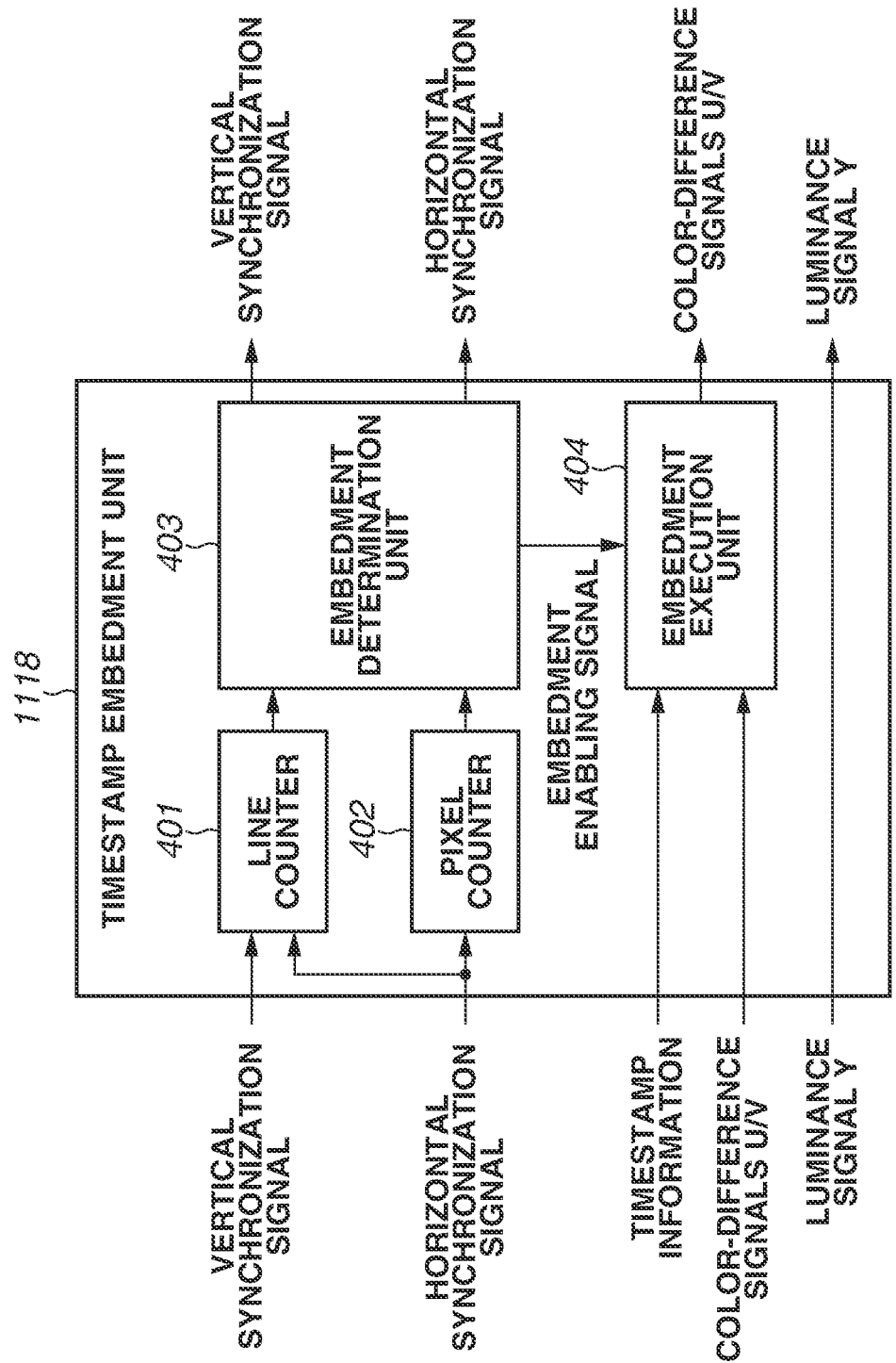
FIG. 4 is a functional block diagram of a timestamp embedment unit according to one or more aspects of the present disclosure.

Next, the timestamp embedment unit 1118 performs embedment of timestamps into the captured video images 1 and 2 with image processing performed thereon. Since, if a timestamp is embedded into data of a captured video image before image processing is performed thereon, data of pixels (pixel values) is changed by image processing, embedment of a timestamp is performed at timing after image processing. The timestamp embedment unit 1118 is described in detail. FIG. 4 is a functional block diagram illustrating details of the timestamp embedment unit 1118. Furthermore, the timestamp embedment unit 1119 also has a similar configuration, and, therefore, the description thereof is omitted.

The timestamp embedment unit 1118 includes a line counter 401, a pixel counter 402, an embedment determination unit 403, and an embedment execution unit 404. The vertical synchronization signal and the horizontal synchronization signal are input to the line counter 401, so that the pixel position in the vertical direction in an image included in the captured video image 1 is counted. The horizontal synchronization signal is input to the pixel counter 402, so that the pixel position in the horizontal direction is counted. Respective outputs of the line counter 401 and the pixel counter 402 are inputs to the embedment determination unit 403. The embedment determination unit 403 identifies an embedment position of timestamp information based on an input pixel position obtained according to these inputs, and issues an embedment enabling signal to the embedment execution unit 404. Moreover, the embedment determination unit 403 outputs the vertical synchronization signal and the horizontal synchronization signal.

The embedment execution unit 404 embeds timestamp information into the captured video image 1 at the identified embedment position according to the embedment enabling signal input from the embedment determination unit 403. Here, as mentioned above, human eyes are insensitive to a change in color-difference signal. For this reason, in the present exemplary embodiment, embedment of timestamp information is performed into color-difference signals U/V after UV conversion in a predetermined pixel in an image configuring the captured video image 1. However, the destination of embedment of timestamp information is not limited to this configuration, but timestamp information can be embedded into other signals such as RGB signals.

A pixel into which to embed timestamp information with respect to the captured video image 1 is selected according to the pixel position in the vertical direction and horizontal direction with respect to which the embedment enabling signal is issued. The position of the pixel into which to embed timestamp information with respect to the captured video image 1 is determined in such a way as to be a position that is relatively low in visibility for the user or a position that is invisible in an image which is presented to the user via the displays 131 and 132. Details of that are described below.

Figure 5:
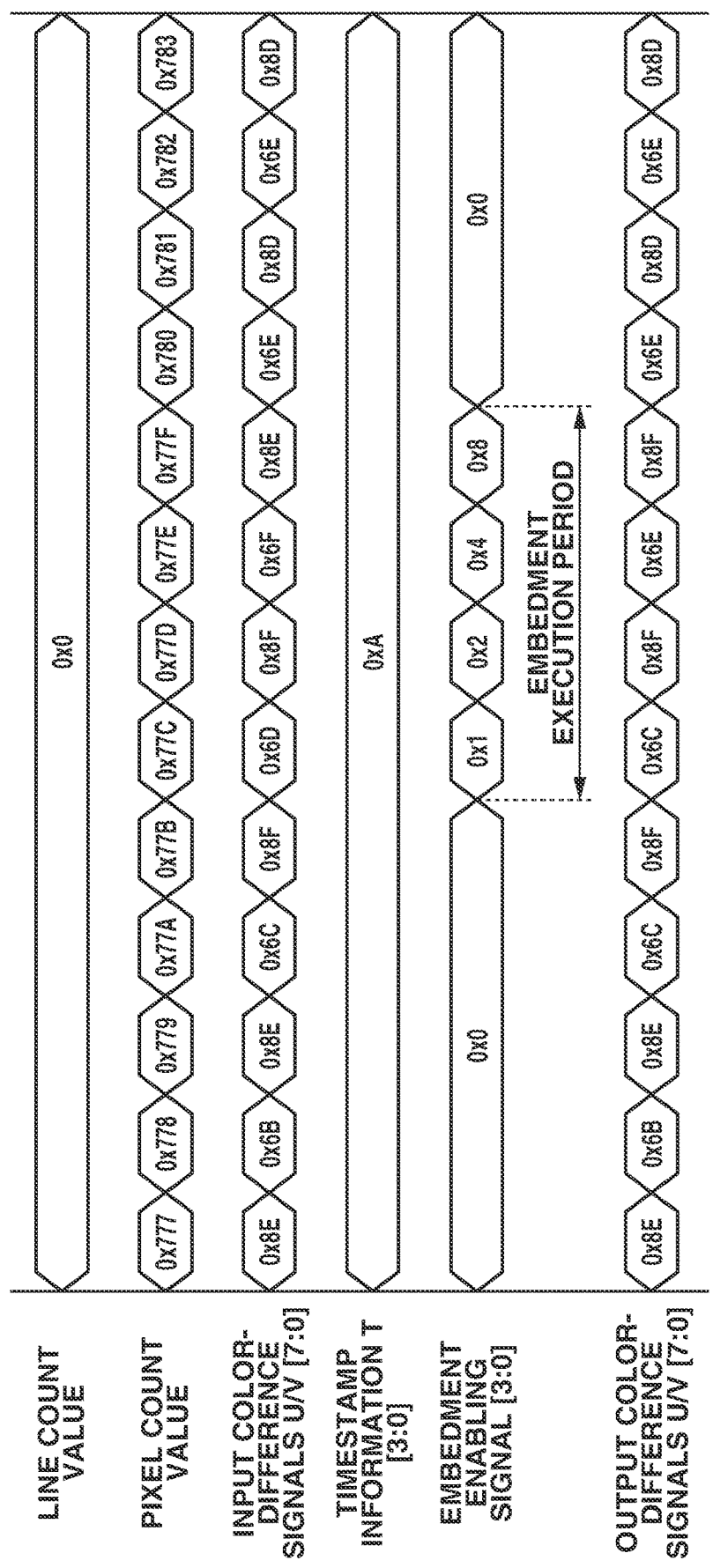
FIG. 5 is a timing chart illustrating operations of the timestamp embedment unit according to one or more aspects of the present disclosure.

FIG. 5 is a timing chart of embedment processing of timestamp information in the timestamp embedment unit 1118. In FIG. 5, "Line count value" and "Pixel count value" respectively represent count values output from the line counter 401 and the pixel counter 402.

"Input color-difference signals" represents UV signals as color-difference signals among YUV signals input from the color conversion unit 1116. Moreover, "Timestamp information T" represents timestamp information input via the color conversion unit 1116. At this time, the embedment enabling signal, which is output from the embedment determination unit 403, is assumed to vary as illustrated in FIG. 5.

The embedment enabling signal in the present exemplary embodiment is a four-bit signal and has the same bit width as that of the timestamp information T. The embedment execution unit 404 recognizes each bit of the embedment enabling signal, when expressed as a binary number, as an enable signal for embedding each bit of timestamp information into input color-difference signals. Specifically, in a case where the value of the embedment enabling signal is 0x1, the embedment execution unit 404 replaces the least significant bit of the input color-difference signals with the first bit of the timestamp information T, when expressed as a binary number, thus generating output color-difference signals. Similarly, in cases where the values of the embedment enabling signal are 0x2, 0x4, and 0x8, the embedment execution unit 404 replaces the least significant bit of the input color-difference signals with the second bit, third bit, and fourth bit, respectively, of the timestamp information T, when expressed as a binary number, thus generating output color-difference signals.

Hereinafter, details of the above-mentioned processing are described with reference to FIG. 5. Referring to FIG. 5, the value of the timestamp information T is 0xA ("1010" when expressed as a binary number), in which the first bit is 0, the second bit is 1, the third bit is 0, and the fourth bit is 1.

When the value of the embedment enabling signal is "0x1", the embedment execution unit 404 deems this embedment enabling signal to be an enable signal for embedding the first bit of the four-bit signal representing the timestamp information T into the input color-difference signals. The value of the input color-difference signals when the value of the embedment enabling signal is "0x1" is 0x6D, and the least significant bit thereof is "1". Accordingly, the embedment execution unit 404 replaces the least significant bit "1" with "0", which is the first bit of the timestamp information T. As a result, 0x6D, which is the value of the input color-difference signals, is decremented by one and is thus changed to 0x6C, so that this value is output as the output color-difference signals.

When the value of the embedment enabling signal is "0x2", the embedment execution unit 404 deems this embedment enabling signal to be an enable signal for embedding the second bit of the four-bit signal representing the timestamp information T into the input color-difference signals. The value of the input color-difference signals when the value of the embedment enabling signal is "0x2" is 0x8F, and the least significant bit thereof is "1". Accordingly, the embedment execution unit 404 replaces the least significant bit "1" with "1", which is the second bit of the timestamp information T. As a result, 0x8F, which is the value of the input color-difference signals, is not changed, so that the input color-difference signals are directly output as output color-difference signals.

When the value of the embedment enabling signal is "0x4", the embedment execution unit 404 deems this embedment enabling signal to be an enable signal for embedding the third bit of the four-bit signal representing the timestamp information T into the input color-difference signals. The value of the input color-difference signals when the value of the embedment enabling signal is "0x4" is 0x6F, and the least significant bit thereof is "1". Accordingly, the embedment execution unit 404 replaces the least significant bit "1" with "0", which is the third bit of the timestamp information T. As a result, 0x6F, which is the value of the input color-difference signals, is decremented and is thus changed to 0x6E, so that this value is output as the output color-difference signals.

When the value of the embedment enabling signal is "0x8", the embedment execution unit 404 deems this embedment enabling signal to be an enable signal for embedding the fourth bit of the four-bit signal representing the timestamp information T into the input color-difference signals. The value of the input color-difference signals when the value of the embedment enabling signal is "0x8" is 0x8E, and the least significant bit thereof is "0". Accordingly, the embedment execution unit 404 replaces the least significant bit "0" with "1", which is the fourth bit of the timestamp information T. As a result, 0x8E, which is the value of the input color-difference signals, is incremented and is thus changed to 0x8F, so that this value is output as the output color-difference signals.

In this way, timestamp information T representing "1010" is embedded into the least significant bits of the output color-difference signals 0x6C, 0x8F, 0x6E, and 0x8F. Furthermore, the input color-difference signals may be decremented or incremented by "1" by the processing for embedding the timestamp information T, so that, as a result, the image quality decreases. However, since the input color-difference signals change only by "1" at a maximum, colors represented by the input color-difference signals never change drastically, so that timestamp information can be embedded into color-difference signals while the image quality is prevented or reduced from being decreased.

The captured video images 1 and 2 into which the timestamp information has been embedded by the image processing unit 11 in the above-described way are transmitted to the image processing apparatus via an external interface (I/F). Then, the image combining unit 12 of the image processing apparatus receives and acquires the captured video images 1 and 2 with the embedded timestamp information transmitted from the HMD via the external I/F.

Next, processing which is performed on the captured video images 1 and 2 by the image combining unit 12 is described. The image combining unit 12 superimposes CG on the captured video images 1 and 2 input from the image processing unit 11 and thus outputs the captured video images 1 and 2 with CG superimposed thereon as display video images. As illustrated in FIG. 1, the image combining unit 12 includes an image synchronization unit 121, which performs synchronization processing on a plurality of captured video images which are input at different timings, and a CG rendering position calculation unit 122, which calculates CG rendering positions by analyzing a plurality of captured video images synchronized. Moreover, the image combining unit 12 further includes a CG combining unit 123, which performs superimposition of CG content according to the calculated CG rendering positions. In a case where input timings of the captured video images 1 and 2 become different from each other due to, for example, a communication condition of the communication path between the HMD and the image processing apparatus, the image synchronization unit 121 performs processing for synchronizing images with each other by comparing respective pieces of timestamp information embedded in the captured video images 1 and 2 with each other.

Figure 6:
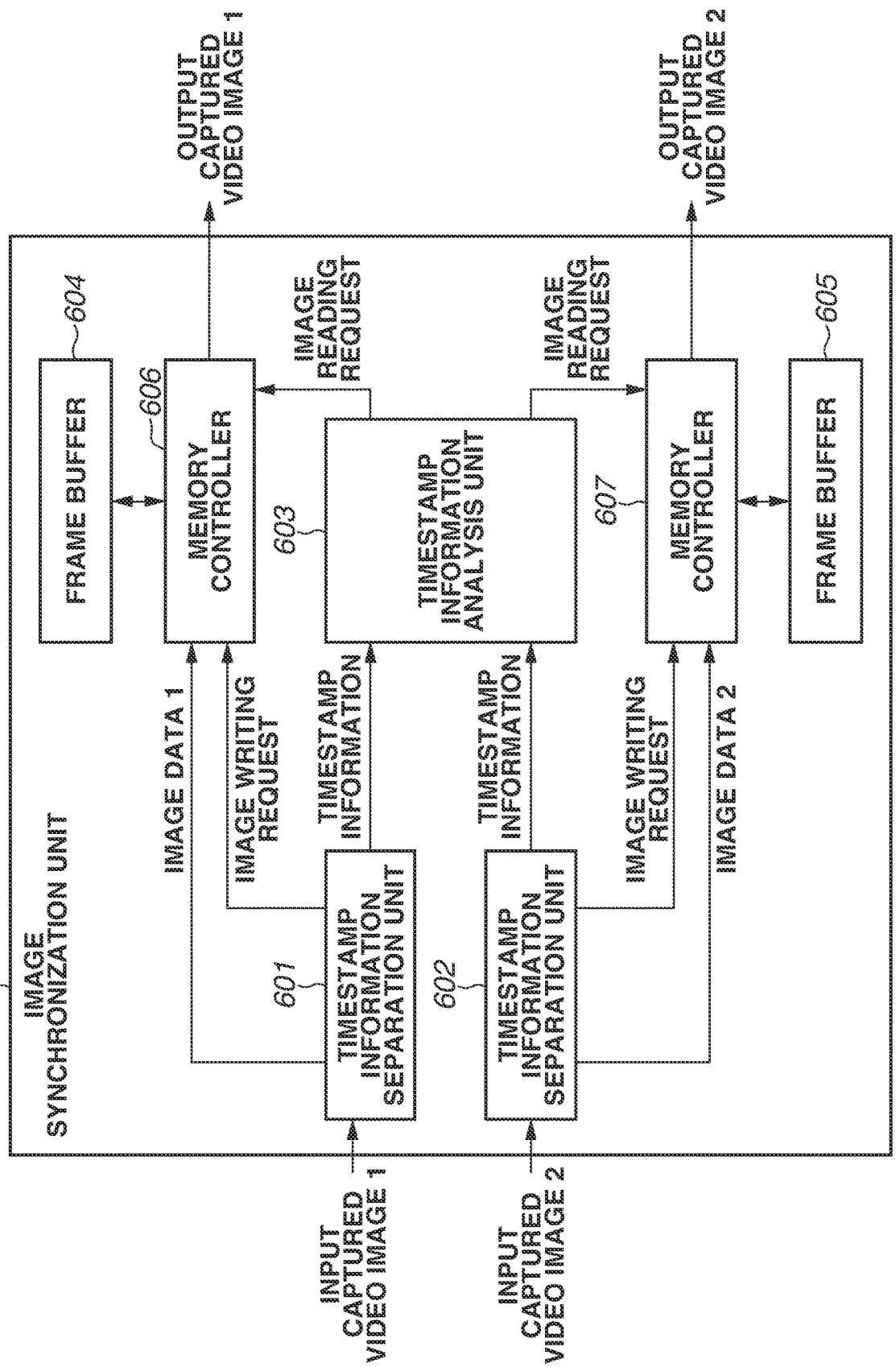
FIG. 6 is a functional block diagram of an image synchronization unit according to one or more aspects of the present disclosure.

FIG. 6 is a functional block diagram of the image synchronization unit 121. The image synchronization unit 121 includes timestamp information separation units 601 and 602, which separate respective pieces of timestamp information embedded in the captured video images 1 and 2. Moreover, the image synchronization unit 121 further includes a timestamp information analysis unit 603, which analyzes the separated plurality of pieces of timestamp information to control transfer of images (frames of captured video images). Furthermore, the image synchronization unit 121 further includes frame buffers 604 and 605, which buffer captured video images, and memory controllers 606 and 607, which control reading from and writing to the frame buffers 604 and 605 in response to requests.

Hereinafter, processing which is performed by the timestamp information separation units 601 and 602, the timestamp information analysis unit 603, the frame buffers 604 and 605, and the memory controllers 606 and 607 on the captured video images 1 and 2 input from the image processing unit 11 is described.

The timestamp information separation unit 601 separates and restores timestamp information from the above-mentioned color-difference signals in pixels present at the above-mentioned embedment position of an image configuring the input captured video image 1.

Specifically, as illustrated in FIG. 5, the timestamp information separation unit 601 obtains the pixel position in the vertical direction from the line count value and obtains the pixel position in the horizontal direction from the pixel count value in the embedment execution period specified by the embedment enabling signal. As mentioned above, the value of the timestamp information is "1010", and this value is embedded in pixels present at positions in which the line count value is 0x0 and the pixel count values are 0x77C, 0x77D, 0x77E, and 0x77F. Accordingly, the timestamp information separation unit 601 is able to obtain the value "1010" of the input timestamp information T from the first bits in the color-difference signals in the 1792-th pixel to the 1795-th pixel in the horizontal direction on the bottom line in the vertical direction of an image.

After restoring the timestamp information in this way, the timestamp information separation unit 601 can set all of the least significant bits of the color-difference signals to "1" or to "0", or can directly use the color-difference signals with the timestamp information restored.

After separating the captured video image 1 into timestamp information and image data, the timestamp information separation unit 601 issues an image writing request and sends the image data to the memory controller 606, and sends the timestamp information to the timestamp information analysis unit 603. The memory controller 606 performs writing processing on the frame buffer 604 in response to the image writing request.

The timestamp information separation unit 602 performs similar processing on the input captured video image 2 via the timestamp information analysis unit 603, the frame buffer 605, and the memory controller 607.

The timestamp information analysis unit 603 issues an image reading request to the memory controller 606 based on the timestamp information input from the timestamp information separation unit 601. In response to the image reading request, the memory controller 606 performs reading processing on the frame buffer 604. Moreover, the timestamp information analysis unit 603 issues an image reading request to the memory controller 607 based on the timestamp information input from the timestamp information separation unit 602. In response to the image reading request, the memory controller 607 performs reading processing on the frame buffer 605.

Figure 7:
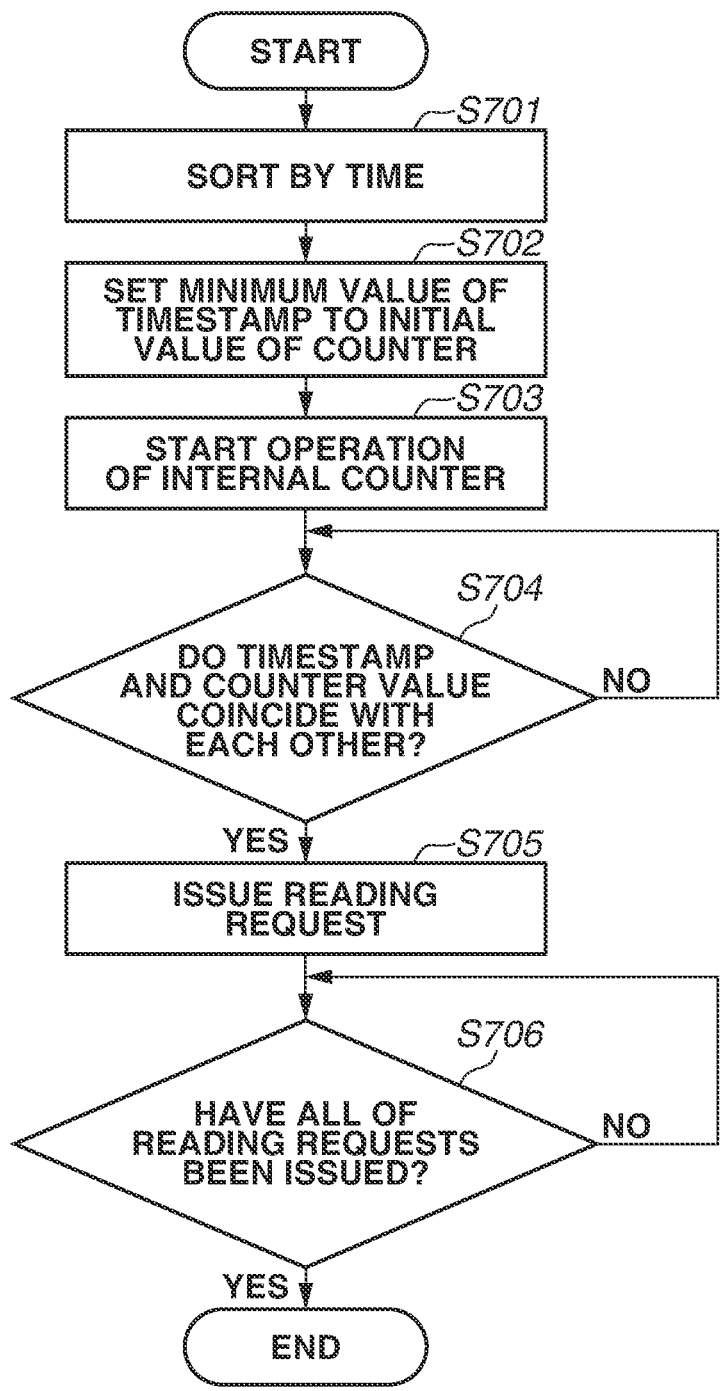
FIG. 7 is a flowchart illustrating an operation of a timestamp information analysis unit according to one or more aspects of the present disclosure.

FIG. 7 is a flowchart illustrating an operation of the timestamp information analysis unit 603. In step S701, the timestamp information analysis unit 603 performs sort processing for sorting an input plurality of pieces of timestamp information based on time. At this time, in step S702, the timestamp information analysis unit 603 sets an initial value of an internal counter based on the earliest timestamp information. In the present exemplary embodiment, the timestamp information analysis unit 603 sets the minimum value of timestamp information as an initial value of the counter.

Next, in step S703, the timestamp information analysis unit 603 starts an operation of the internal counter with the initial value set in step S702. The counter as used here is assumed to be a counter having the same period as that of the timestamp generation unit 110 included in the image processing unit 11. In step S704, the timestamp information analysis unit 603 makes a comparison between the counter value of the internal counter and the sorted pieces of timestamp information starting with the minimum value thereof, and, if the counter value and the timestamp information coincide with each other (YES in step S704), then in step S705, the timestamp information analysis unit 603 issues a reading request, and then advances the processing to step S706. Otherwise (NO in step S704), the timestamp information analysis unit 603 re-performs processing in step S704.

In step S706, the timestamp information analysis unit 603 determines whether all of the reading requests have been issued. If it is determined that not all of the reading requests have been issued (NO in step S706), the timestamp information analysis unit 603 re-performs processing in step S706. If it is determined that all of the reading requests have been issued (YES in step S706), the timestamp information analysis unit 603 ends the processing. By performing the above steps for every frame, the timestamp information analysis unit 603 is able to perform setting to correct time lags between a plurality of captured video images which are input at respective different timings.

In the above-described way, in the present exemplary embodiment, synchronization between images is correctly performed with respect to four images, i.e., an image for background and an image for position and orientation calculation of the captured video image 1 and an image for background and an image for position and orientation calculation of the captured video image 2.

Referring back to FIG. 1, the CG rendering position calculation unit 122 analyzes images of a plurality of input captured video images (an image for position and orientation calculation of the captured video image 1 and an image for position and orientation calculation of the captured video image 2) to estimate the position and orientation of the HMD, and performs a calculation to calculate rendering positions of CG. Since this calculation is performed based on a plurality of captured video images, as a temporal relationship between captured video images is more correctly found, the precision of rendering position calculation is improved. In the case of the present exemplary embodiment, since synchronization is correctly performed as mentioned above, the position and orientation of the HMD can be accurately estimated.

In the present exemplary embodiment, since an image for position and orientation calculation of the captured video image 1 and an image for position and orientation calculation of the captured video image 2 are input at correct timing with reference to the timestamp information, the CG rendering position calculation unit 122 is able to obtain CG rendering positions with great accuracy.

The CG combining unit 123 generates a composite image by rendering CG on images for background of the captured video images 1 and 2 based on the rendering position information calculated by the CG rendering position calculation unit 122 to perform image combining processing. In this case, the CG combining unit 123 renders CG on images for background of the captured video images 1 and 2 synchronized with the images for position and orientation calculation used to calculate the CG rendering positions.

Accordingly, a composite image can be generated by arranging CG at an intended position on an image for background of the captured video image, so that a mixed reality video image (composite image) in which CG content is arranged at correct timing in an optional position of an image for background of the captured video image can be formed.

Data of the composite image generated by the image combining unit 12 is transmitted from the image processing apparatus to the HMD. Then, the display unit 13, which is provided in the HMD, displays video images with CG combined therewith by the image combining unit 12 on the displays 131 and 132, each of which uses a display panel such as a liquid crystal display or an organic electroluminescence (EL) display.

Next, processing for selecting pixels in which to embed timestamp information, which is performed by the timestamp embedment units 1118 and 1119, is described in detail.

Figure 8:
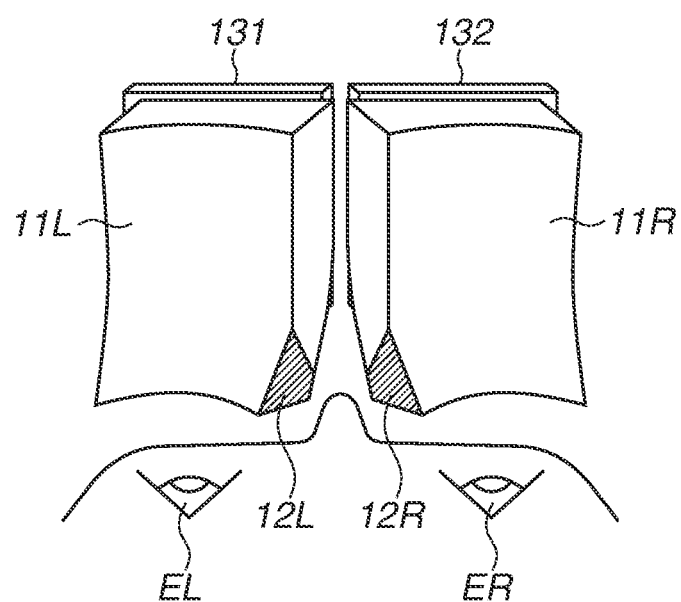
FIG. 8 is an explanatory diagram of displays of a head-mounted display (HMD).

FIG. 8 is an explanatory diagram of the display unit 13. The display unit 13 includes the displays 131 and 132, which are respectively arranged in front of the left eye EL and right eye ER of the user and each of which has an approximately rectangular display area. Furthermore, while the displays 131 and 132 are arranged approximately in parallel with the face of the user, for convenience of description, FIG. 8 illustrates the displays 131 and 132 as if being arranged at right angle to the face of the user in an enlarged manner.

A prism body 11L for left eye and a prism body 11R for right eye are respectively arranged between the display 131 and the left eye EL and between the display 132 and the right eye ER. An optical element is configured with the prism body 11L and the prism body 11R. The prism body 11L is in the shape of an approximately quadrangular pillar as illustrated in FIG. 8, and has four corner portions each facing the face of the user. The corner portion adjacent to the nose of the user among the four corner portions has a portion the display area of which is reduced in conformity with the shape of the nose of the user in such a manner that the corner portion does not interfere with the nose when the user wears the HMD. In the present exemplary embodiment, the display area is reduced by cutting a corner portion adjacent to the nose of the user.

The portion obtained by such cutting is illustrated as a truncated portion 12L in FIG. 8. Furthermore, while, in the present exemplary embodiment, the display area of each of the displays 131 and 132 included in the display unit 13 is reduced in such a manner that the display area does not interfere with the nose of the user, the display area can also be reduced in such a shape as to avoid interfering with any portion of the face of the user, such as the eye orbit of the user.

Similarly, the prism body 11R is also in the shape of an approximately quadrangular pillar, and has four corner portions each facing the face of the user. The corner portion adjacent to the nose of the user among the four corner portions is cut in conformity with the shape of the nose of the user in such a manner that the corner portion does not interfere with the nose when the user wears the HMD. The portion obtained by such cutting is illustrated as a truncated portion 12R in FIG. 8.

Furthermore, the region of each of the truncated portions 12L and 12R obtained by cutting in conformity with the shape of the nose of the user is also referred to as a "nose clearance". In the present exemplary embodiment, in the display 131 corresponding to the left eye, a lower right region of the display area in an approximately rectangular shape serves as a nose clearance region. Moreover, in the display 132 corresponding to the right eye, a lower left region of the display area in an approximately rectangular shape serves as a nose clearance region.

Light fluxes entering from the displays 131 and 132 are guided by the prism bodies 11L and 11R to the eyes EL and ER of the user, respectively. However, since the truncated portions 12L and 12R of the prism bodies 11L and 11R are formed by cutting parts of the prism bodies 11L and 11R as mentioned above, light fluxes entering the truncated portions 12L and 12R from the displays 131 and 132 are not guided to the eyes of the user. Accordingly, video images falling on portions adjacent to the nose side of the user, which correspond to the truncated portions 12L and 12R in the displays 131 and 132, are gradually reduced in light intensity as the video images come closer to the nose of the user.

From the above reason, in video images displayed on the displays 131 and 132, video images at regions corresponding to the truncated portions 12L and 12R serve as regions which are hardly visible by the user or are invisible by the user. Furthermore, in the context of the present specification, a region which is hardly visible by the user and a region which is invisible by the user are collectively referred to as a "region which is relatively low in visibility". On the other hand, a region which is relatively high in visibility is, for example, a central portion of the display area. In the present exemplary embodiment, timestamp information is embedded in a region on image data corresponding to the regions of the truncated portions 12L and 12R, each of which serves as a region which is relatively low in visibility.

Figure 9:
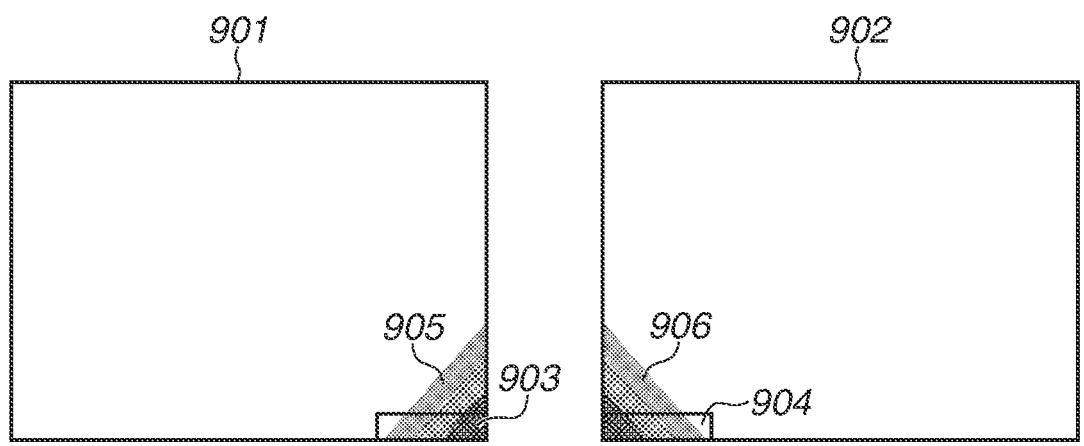
FIG. 9 is an explanatory diagram of video images which the user views via prism bodies.

FIG. 9 is an explanatory diagram of video images which the user views via the prism bodies 11L and 11R in the present exemplary embodiment. Referring to FIG. 9, a video image 901 is a video image which is displayed on the display 131 and is viewed with the left eye EL of the user via the prism body 11L. A nose clearance region 905 is a region in which a light flux having emitted from the display 131 and passed through the truncated portion 12L, which is not guided to the left eye EL of the user, is reduced in light intensity as the light flux comes closer to the end portion adjacent to the nose of the user. In the present exemplary embodiment, timestamp information is embedded in pixels present at a position indicated by a lower right region 903 of the video image 901 in the captured video image 1, which corresponds to the nose clearance region 905.

Referring to FIG. 9, a video image 902 is a video image which is displayed on the display 132 and is viewed with the right eye ER of the user via the prism body 11R. A nose clearance region 906 is a region in which a light flux having emitted from the display 132 and passed through the truncated portion 12R, which is not guided to the right eye ER of the user, is reduced in light intensity as the light flux comes closer to the end portion adjacent to the nose of the user. In the present exemplary embodiment, timestamp information is embedded in pixels present at a position indicated by a lower left region 904 of the video image 902 in the captured video image 2, which corresponds to the nose clearance region 906.

In this way, while embedding timestamp information causes a decrease in image quality, a region in which the decrease in image quality is caused is located at a position which is relatively low in visibility for the user.

As described above, according to the present exemplary embodiment, a region in which timestamp information is embedded in images configuring a captured video image is selected and set in such a manner that the position of the region corresponds to a nose clearance region, which is relatively low in visibility for the user, in each of the displays 131 and 132. This enables a region in which the image quality is decreased by timestamp information being embedded therein to be located at a position which is low in visibility and is of low importance in a visual way when the user experiences mixed reality. Accordingly, mixed reality can be provided to the user without causing a feeling of strangeness, while attaining an accuracy improvement in CG rendering positions by performing synchronization of the input captured video images 1 and 2.

Moreover, since timestamp information is embedded in color-difference signals, to which human eyes are insensitive, the degree of decrease in image quality can be more reduced.

Furthermore, in the present exemplary embodiment, in the image processing unit 11, each of video images output from two cameras, i.e., the cameras 101 and 102, is branched into two video images. However, if the HMD has four cameras arranged, such branching does not need to be performed.

Figure 10:
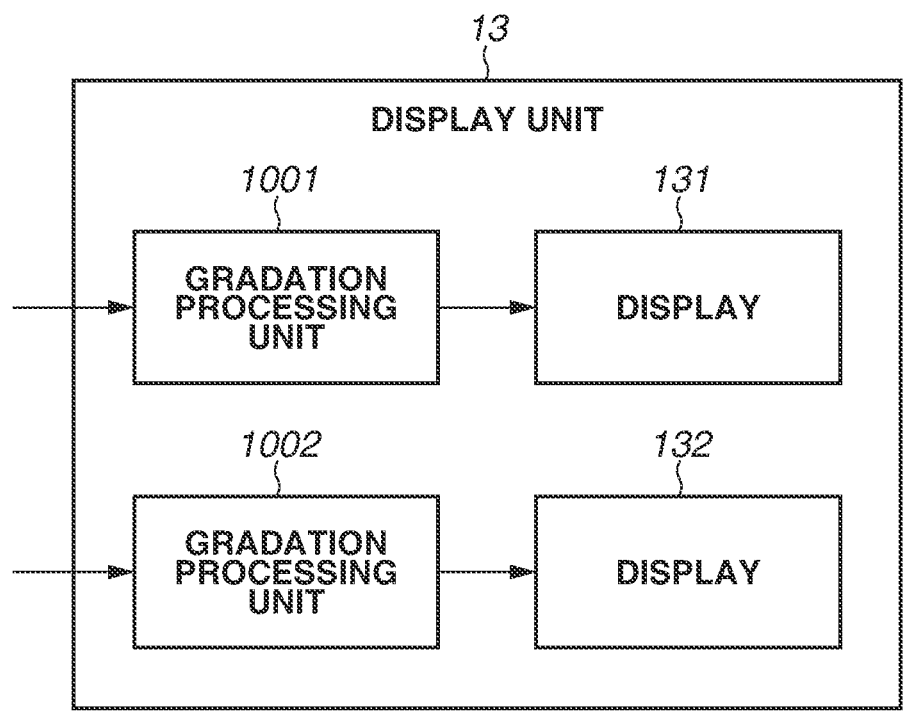
FIG. 10 is a functional block diagram of a display unit according to one or more aspects of the present disclosure.
Figure 11:
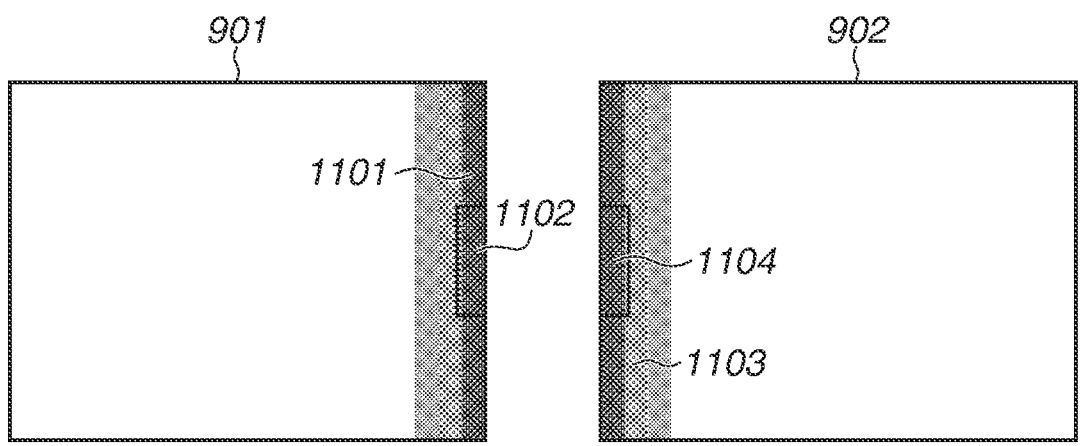
FIG. 11 is an explanatory diagram of video images subjected to gradation processing.

A second exemplary embodiment of the disclosure is described with reference to FIG. 10 and FIG. 11. FIG. 10 is a functional block diagram of the display unit 13 included in the HMD in the second exemplary embodiment of the disclosure. FIG. 11 is an explanatory diagram of video images subjected to gradation processing, which the user views via the prism bodies, in the second exemplary embodiment. In the second exemplary embodiment, configurations other than the display unit 13 are similar to those in the first exemplary embodiment, and the detailed description thereof is, therefore, omitted. In the second exemplary embodiment, gradation processing units 1001 and 1002, which make left and right parallax images observable in a natural way by the user, are additionally included in the display unit 13.

In the present exemplary embodiment, video images having respective different angles of view are presented to the left and right eyes by the displays 131 and 132 and only some angles of view are made viewable in an overlapping manner by the left and right eyes, so that a subject can be viewed in a stereoscopic manner. However, in such a configuration, a phenomenon in which a boundary portion between a monocular region and a binocular region becomes conspicuous, thus hindering natural observation, occurs. This phenomenon would be caused by the fact that binocular rivalry of the left and right eyes causes an image to be presented to one eye and causes no image to be presented to the other eye so that a dark portion such as a non-display portion of the panel of a display becomes visible. Therefore, in the present exemplary embodiment, a gradation processing unit is provided to perform gradation processing on a video image to be displayed, thus making the dark portion inconspicuous.

The gradation processing unit 1001 receives, from the image combining unit 12, a composite image obtained by superimposing CG on an image of each frame of the captured video image 1. The gradation processing unit 1001 performs gradation processing on the input composite image.

Similarly, the gradation processing unit 1002 receives, from the image combining unit 12, a composite image obtained by superimposing CG on an image of each frame of the captured video image 2. The gradation processing unit 1002 performs gradation processing on the input composite image.

A video image 901 illustrated in FIG. 11 is a video image which is displayed on the display 131 and is viewed with the left eye of the user via a prism body. A video image 902 is a video image which is displayed on the display 132 and is viewed with the right eye of the user via a prism body. When such video images 901 and 902 are observed by the user, the video images 901 and 902 are merged in the head of the user and are thus observed in such a manner that some regions thereof are overlapped. However, at that time, a problem arises in that, since a part of the left end of the video image 901 serves as a monocular region that is viewed only with the left eye and a part of the right end of the video image 902 serves as a monocular region that is viewed only with the right eye, boundary portions between the monocular regions and an overlapping region that is viewed in an overlapping manner become conspicuous. Therefore, as illustrated in FIG. 11, gradation regions 1101 and 1103 are provided at positions adjacent to the boundary portions, thus reducing influences of the boundary portions.

The gradation region 1101 is a region on which gradation processing has been performed by the gradation processing unit 1001 with respect to the captured video image 1 with CG superimposed thereon.

The gradation processing unit 1001 performs gradation processing on the right end portion of the left-eye video image 901, which corresponds to an inside region adjacent to the boundary between the overlapping region and the monocular region at the time of a stereoscopic view with the left and right eyes of the user. This gradation processing gradually reduces the luminance of a video image from the inside of the video image 901 toward the right end.

The video image 902 illustrated in FIG. 11 is a video image which is displayed on the display 132 and is viewed with the right eye of the user via a prism body. The gradation region 1103 is a region on which gradation processing has been performed by the gradation processing unit 1002 with respect to the captured video image 2 with CG superimposed thereon.

The gradation processing unit 1002 performs gradation processing on the left end portion of the right-eye video image 902, which corresponds to an inside region adjacent to the boundary between the overlapping region and the monocular region at the time of a stereoscopic view with the left and right eyes of the user. This gradation processing gradually reduces the luminance of a video image from the inside of the video image 902 toward the left end.

In the second exemplary embodiment, each of the gradation processing units 1001 and 1002 varies the gain value in a linear manner from 0% to 100% according to the horizontal position of the gradation region of a video image, and multiplies pixel values of the video image by the gain value. This produces the pixel values of the gradation regions 1101 and 1103. In the present exemplary embodiment, each of the gradation processing units 1001 and 1002 varies the luminance value according to the horizontal position of the gradation region, but, without being limited to this, can also vary the gain value with respect to the vertical direction or vary the gain value in a non-linear manner.

Moreover, in the present exemplary embodiment, pieces of timestamp information to be embedded by the timestamp embedment units 1118, 1119, 1128, and 1129 are embedded at positions in the gradation regions 1101 and 1103. In FIG. 11, timestamp information regarding the captured video image 1 is embedded in one or more pixels of an embedment region 1102 at the right end portion in the left-eye video image 901. Similarly, timestamp information regarding the captured video image 2 is embedded in one or more pixels of an embedment region 1104 at the left end portion in the right-eye video image 902. Each of the embedment regions 1102 and 1104 is a region in which the luminance is reduced in a composite image to be displayed by the display unit 13, and is thus a region which is relatively low in visibility for the user.

As described above, in the present exemplary embodiment, regions in which timestamp information is embedded in images configuring a captured video image are set in such a manner that the positions of the regions correspond to gradation regions which are relatively low in visibility for the user in the displays 131 and 132. Furthermore, while, in the present exemplary embodiment, a gradation region is set at an inside region adjacent to a boundary between the overlapping region and the monocular region, a gradation region can be set at an outside region adjacent to the boundary or can be set at both the inside region and the outside region. Thus, the present exemplary embodiment can be widely applied to a case where gradation processing is performed on a region adjacent to a boundary between the overlapping region and the monocular region.

A third exemplary embodiment of the disclosure is described with reference to FIG. 12 and FIGS. 13A and 13B.

Figure 12:
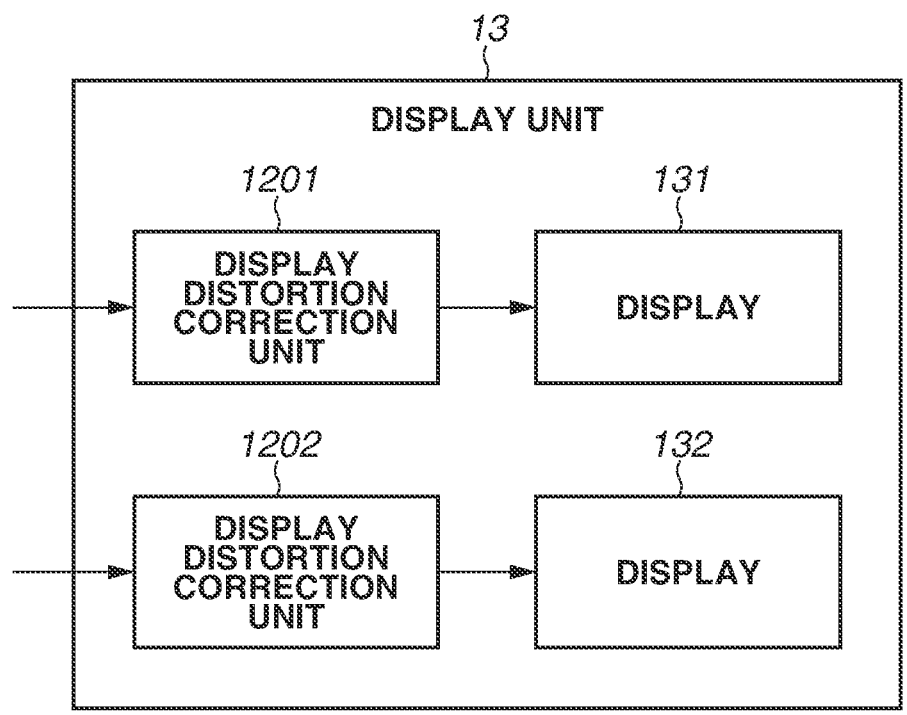
FIG. 12 is a functional block diagram of a display unit according to one or more aspects of the present disclosure.

FIG. 12 is a functional block diagram of the display unit 13 included in the HMD in the third exemplary embodiment.

In the third exemplary embodiment, configurations other than the display unit 13 are similar to those in the first exemplary embodiment, and the detailed description thereof is, therefore, omitted. In the third exemplary embodiment, the display unit 13 further includes display distortion correction units 1201 and 1202 provided to correct optical distortion of the prism bodies 11L and 11R, which are optical members that cause optical aberration.

The display distortion correction unit 1201 receives, from the image combining unit 12, a composite image obtained by superimposing CG on an image of each frame of the captured video image 1. The display distortion correction unit 1201 performs display distortion correction processing on the input composite image.

Similarly, the display distortion correction unit 1202 receives, from the image combining unit 12, a composite image obtained by superimposing CG on an image of each frame of the captured video image 2. The display distortion correction unit 1202 performs display distortion correction processing on the input composite image.

FIG. 13A is an explanatory diagram of a composite image obtained by superimposing CG on a frame image of the captured video image 1 in the present exemplary embodiment, and FIG. 13B is an explanatory diagram of a video image which is viewed by the user via the prism body 11L. Pincushion distortion optically occurs in a video image having passed through the prism body 11L. For the sake of description, in FIG. 13A, a composite video image 1301 including a plurality of line segments in a grid-like pattern is displayed. A video image which the user views via the prism body 11L when the composite video image 1301 is directly displayed on the display 131 is illustrated in FIG. 13B. As indicated by distortion of a grid in a video image 901 illustrated in FIG. 13B, a video image which the user views is distorted in such a manner that the vicinity of the middle position of each side is enlarged toward the center of the video image.

Specifically, a line segment which is indicated by L1 in FIG. 13A and is present at a position to some extent away from the lower edge of the video image in the middle portion of the lower side of the composite video image 1301 is displayed as a curved line convex upward which is present in the vicinity of the lower edge of the video image in the middle portion of the lower side of the captured video image 1 in FIG. 13B. On the other hand, a line segment which is indicated by L2 in FIG. 13A and is present in the vicinity of the lower edge of the video image in the middle portion of the lower side of the captured video image 1 is not viewed by the user. In this way, depending on the prism bodies 11L and 11R, a region which comes off the inside of a display area due to optical distortion occurs.

Figure 14A:
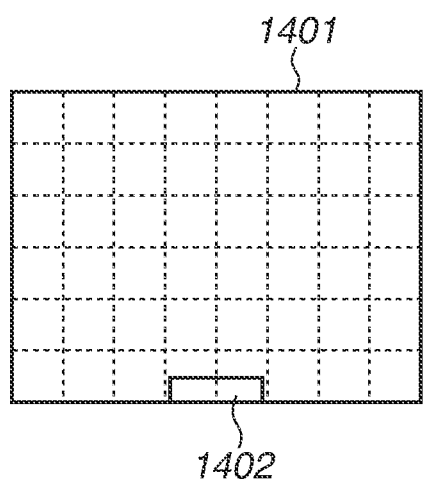
FIG. 14A is an explanatory diagram of a region in which timestamp information is embedded.

FIG. 14A is an explanatory diagram of an embedment region 1402, in which timestamp information is embedded by the timestamp embedment unit 1118, in a composite video image 1401 in the present exemplary embodiment. As illustrated in FIG. 14A, the embedment region 1402 is located at a region which would come off the inside of the display area due to optical distortion, and, specifically, is set at a position in the vicinity of the line segment L2 illustrated in FIG. 13A. Accordingly, the embedment region 1402 is not displayed in a video image which the user views via the prism body 11L.

Figure 14B:
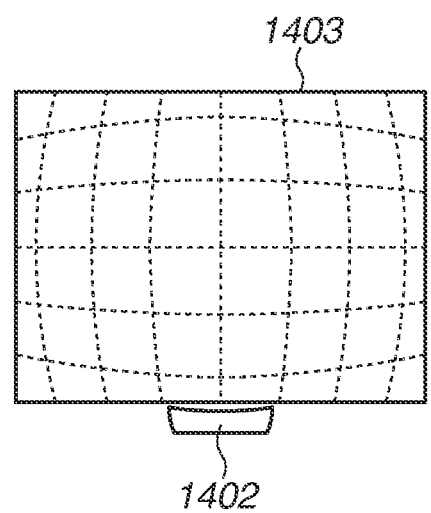
FIG. 14B is an explanatory diagram illustrating details of distortion correction.

FIG. 14B is an explanatory diagram illustrating details of distortion correction when display distortion correction is performed by the display distortion correction unit 1201. Distortion correction performed by the display distortion correction unit 1201 distorts a screen to a barrel shape, as illustrated in FIG. 13B, in such a way as to compensate for distortion caused by the prism body 11L. Accordingly, in the distortion correction performed by the display distortion correction unit 1201, the vicinity of the central portion of a composite video image 1403 is enlarged toward the surrounding sides as illustrated in FIG. 14B. Moreover, the vicinity of the middle portion of each side of the composite video image 1403 is distorted in such a way as to become convex toward outside the screen. As a result, the embedment region 1402 is moved to outside a region which is displayed to the user, as illustrated in FIG. 14B. Furthermore, this also applies to display distortion correction performed by the display distortion correction unit 1202.

In this way, in the present exemplary embodiment, the display distortion correction unit 1201 distorts a composite video image (composite image) in such a way as to compensate for pincushion-type optical distortion caused by the prism body 11L, thus, as a result, enabling displaying a distortion-free video image to the user. As a result, the embedment region 1402 is not displayed to the user. Furthermore, with respect to the prism body 11R, the position of a region in which timestamp information is embedded is also set in a similar way. Optical distortion correction itself for a display optical system is a known technique, and the detailed description thereof is, therefore, omitted.

Furthermore, in the present exemplary embodiment, pincushion-type distortion has been described as distortion caused by the prism bodies 11L and 11R. However, distortion caused by the prism bodies 11L and 11R is not limited to this. In any case, the display distortion correction units 1201 and 1202 distort screens in such a way as to compensate for optical distortion caused by the prism bodies 11L and 11R. Then, the whole or at least a part of a region in which timestamp information is embedded is set at a position outside the display area in an image that is displayed to the user.

As described above, according to the first to third exemplary embodiments, the position in which timestamp information is embedded in a captured video image can be optionally set in such a way as to be a specific position in an image that is displayed to the user. The specific position can be set as a position which is invisible or low in visibility for the user or is of low importance in a visual way when the user experiences mixed reality. Accordingly, mixed reality can be provided to the user without causing a feeling of strangeness, while attaining an accuracy improvement in CG rendering positions by performing synchronization of a plurality of input captured video images.

According to exemplary embodiments of the disclosure, even when timestamp information is embedded to synchronize a plurality of input captured video images, a decrease in image quality can be reduced and mixed reality without causing a feeling of strangeness can be provided to the user.

Other Embodiments

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-091011, filed May 1, 2017, which is hereby incorporated by reference herein in its entirety.

What is claimed is:

1. An image display system comprising:
    an acquisition unit configured to acquire first image data and second image data obtained by performing image capturing of a real space with a first imaging unit and third image data and fourth image data obtained by performing image capturing of the real space with a second imaging unit;
    an embedment unit configured to, with respect to each of the acquired first to fourth image data, embed synchronization information used to synchronize the first to fourth image data with each other into data of at least one pixel among pixels configuring each piece of image data;
    a synchronization unit configured to synchronize the first to fourth image data with each other based on the synchronization information embedded in each of the first to fourth image data;
    a calculation unit configured to calculate positions of computer graphics (CG) to be superimposed on the second image data and fourth image data based on the first image data and third image data synchronized with each other;
    a generation unit configured to generate first composite image data and second composite image data by superimposing CG on the second image data and fourth image data based on the calculated positions;
    a color conversion unit configured to generate a luminance signal and color-difference signals with respect to each of the first to fourth image data; and
    a display unit configured to display the generated first composite image data and second composite image data on a first display and second display, respectively,
    wherein the embedment unit embeds the synchronization information into pixels on the first to fourth image data corresponding to pixels included in regions which are hardly visible by a user and regions which are invisible by the user in each of the first composite image data and second composite image when the first composite image data and second composite image data are displayed on the first display and second display, and
    wherein the embedment unit replaces data of the color-difference signals, among the luminance signal and the color-difference signals, with the synchronization information, with respect to the at least one pixel of the first to fourth image data.

2. The image display system according to claim 1, wherein the embedment unit embeds the synchronization information into a plurality of pixels of each of the first to fourth image data.

3. The image display system according to claim 1, further comprising a second generation unit configured to generate information concerning time as the synchronization information,
    wherein the second generation unit generates information concerning time about timing of acquisition of the first to fourth image data by the acquisition unit.

4. The image display system according to claim 1, further comprising an image processing unit configured to perform image processing on the acquired first to fourth image data,
    wherein the image processing unit performs delay processing for delaying the synchronization information according to a delay caused by the image processing being performed, and
    wherein the embedment unit embeds the synchronization information subjected to the delay processing.

5. The image display system according to claim 1, wherein the display unit is provided in an image display apparatus that is used while being worn on a user's head.

6. The image display system according to claim 5, further comprising an optical system used to display the first composite image data and second composite image data on the first display and second display, respectively,
    wherein the embedment unit embeds the synchronization information into pixels on the first to fourth image data corresponding to pixels included in regions which pass through regions in which corner portions of the optical system are cut as the regions which are hardly visible by a user and the regions which are invisible by the user in each of the first composite image data and second composite image.

7. The image display system according to claim 6, wherein the cut corner portions of the optical system are portions that interfere with a user's nose.

8. The image display system according to claim 1, further comprising a gradation processing unit configured to perform gradation processing on the first composite image data and second composite image data,
wherein the embedment unit embeds the synchronization information into pixels on the first to fourth image data corresponding to pixels included in regions subjected to the gradation processing as the regions which are hardly visible by the user and the regions which are invisible by the user in each of the first composite image data and second composite image.

9. The image display system according to claim 8, wherein the display unit displays the first composite image data and second composite image data which are subjected to the gradation processing in a state where the first composite image data and second composite image are partially overlapping each other.

10. The image display system according to claim 1, further comprising a correction unit configured to correct optical distortion when the first composite image data and second composite image data are displayed on the first display and second display, respectively
wherein the embedment unit embeds the synchronization information into pixels on the first to fourth image data corresponding to pixels included in regions which are excluded from a display area by correction of the optical distortion as the regions which are hardly visible by the user and the regions which are invisible by the user in each of the first composite image data and second composite image.

11. The image display system according to claim 1, wherein the first imaging unit is an imaging unit corresponding to a user's left eye, and the second imaging unit is an imaging unit corresponding to a user's right eye.

12. The image display system according to claim 11, wherein the first imaging unit and the second imaging unit are provided in an image display apparatus in which the display unit is included.

13. The image display system according to claim 1, wherein the embedment unit replaces data of a least significant bit of data of the at least one pixel with the synchronization information.

14. The image display system according to claim 1, further comprising a separation unit configured to separate, from the first to fourth image data, pieces of information used to perform synchronization respectively embedded in the first to fourth image data.

15. An image display apparatus comprising:
an acquisition unit configured to acquire first image data and second image data obtained by performing image capturing of a real space with a first imaging unit and third image data and fourth image data obtained by performing image capturing of the real space with a second imaging unit;
an embedment unit configured to, with respect to each of the acquired first to fourth image data, embed synchronization information used to synchronize the first to fourth image data with each other into data of at least one pixel among pixels configuring each piece of image data;
a transmission unit configured to transmit the first to fourth image data with the synchronization information embedded therein to an image processing apparatus;
a reception unit configured to receive first composite image data and second composite image data generated by the image processing apparatus based on the synchronization information embedded in each of the first to fourth image data;
a color conversion unit configured to generate a luminance signal and color-difference signals with respect to each of the first to fourth image data; and
a display unit configured to display the received first composite image data and second composite image data on a first display and second display, respectively,
wherein the embedment unit embeds the synchronization information into pixels on the first to fourth image data corresponding to pixels included in regions which are hardly visible by a user and regions which are invisible by the user in each of the first composite image data and second composite image when the first composite image data and second composite image data are displayed on the first display and second display, and
wherein the embedment unit replaces data of the color-difference signals, among the luminance signal and the color-difference signals, with the synchronization information, with respect to the at least one pixel of the first to fourth image data.

16. The image display apparatus according to claim 15, wherein the embedment unit embeds the synchronization information into a plurality of pixels of each of the first to fourth image data.

17. The image display apparatus according to claim 15, further comprising a generation unit configured to generate information concerning time as the synchronization information,
wherein the generation unit generates information concerning time about timing of acquisition of the first to fourth image data by the acquisition unit.

18. An image display method comprising:
acquiring first image data and second image data obtained by performing image capturing of a real space with a first imaging unit and third image data and fourth image data obtained by performing image capturing of the real space with a second imaging unit;
with respect to each of the acquired first to fourth image data, embedding synchronization information used to synchronize the first to fourth image data with each other into data of at least one pixel among pixels configuring each piece of image data;
synchronizing the first to fourth image data with each other based on the synchronization information embedded in each of the first to fourth image data;
calculating positions of computer graphics (CG) to be superimposed on the second image data and fourth image data based on the first image data and third image data synchronized with each other;
generating first composite image data and second composite image data by superimposing CG on the second image data and fourth image data based on the calculated positions;
generating a luminance signal and color-difference signals with respect to each of the first to fourth image data; and
displaying the generated first composite image data and second composite image data on a first display and second display, respectively,
wherein the synchronization information is embedded into pixels on the first to fourth image data corresponding to pixels included in regions which are hardly visible by a user and regions which are invisible by the user in each of the first composite image data and second composite image when the first composite image data and second composite image data are displayed on the first display and second display, and wherein embedment replaces data of the color-difference signals, among the luminance signal and the color-difference signals, with the synchronization information, with respect to the at least one pixel of the first to fourth image data.

19. A non-transitory computer-readable storage medium storing computer-executable instructions that, when executed by a computer, cause the computer to perform an image display method comprising:

acquiring first image data and second image data obtained by performing image capturing of a real space with a first imaging unit and third image data and fourth image data obtained by performing image capturing of the real space with a second imaging unit;

with respect to each of the acquired first to fourth image data, embedding synchronization information used to synchronize the first to fourth image data with each other into data of at least one pixel among pixels configuring each piece of image data;

synchronizing the first to fourth image data with each other based on the synchronization information embedded in each of the first to fourth image data;

calculating positions of computer graphics (CG) to be superimposed on the second image data and fourth image data based on the first image data and third image data synchronized with each other;

generating first composite image data and second composite image data by superimposing CG on the second image data and fourth image data based on the calculated positions;

generating a luminance signal and color-difference signals with respect to each of the first to fourth image data; and displaying the generated first composite image data and second composite image data on a first display and second display, respectively, wherein the synchronization information is embedded into pixels on the first to fourth image data corresponding to pixels included in regions which are hardly visible by a user and regions which are invisible by the user in each of the first composite image data and second composite image when the first composite image data and second composite image data are displayed on the first display and second display, and wherein embedment replaces data of the color-difference signals, among the luminance signal and the color-difference signals, with the synchronization information, with respect to the at least one pixel of the first to fourth image data.

* * * * *